United States Patent [19]
Klass et al.

[11] 3,882,497
[45] May 6, 1975

[54] SYNCHRONIZING TECHNIQUES FOR AN AIRCRAFT COLLISION AVOIDANCE SYSTEM

[75] Inventors: Philip J. Klass, Washington, D.C.; Charles P. Harman, Jr., Roseville, Minn.

[73] Assignee: Honeywell, Inc., Minneapolis, Minn.

[22] Filed: July 2, 1973

[21] Appl. No.: 375,631

[52] U.S. Cl. .................... 343/6.5 LC; 343/112 CA
[51] Int. Cl. .............................................. G01s 9/56
[58] Field of Search ............ 343/6 R, 6.5 R, 6.5 LC, 343/112 CA

[56] References Cited
UNITED STATES PATENTS
3,550,129   12/1970   Steele .......................... 343/112 CA
3,757,324   9/1973    Litchford ....................... 343/6.5 R Primary Examiner—T. H. Tubbesing
Attorney, Agent, or Firm—Molinare, Allegretti, Newitt & Witcoff

[57] ABSTRACT

A system for avoiding collision between a group of aircraft within range of a ground-controlled radar beam that is cyclically moved so that the beam sequentially strikes the aircraft. Identical radio transmitting and receiving equipment is carried on each aircraft. The equipment is arranged so that an aircraft transmits an interrogating signal only upon receipt of the leading edge of the radar beam, but responds to an interrogating signal at any time. By synchronizing the transmission of interrogating signals with the radar beam, the collision avoidance information transmitted between the airplanes within range of the radar beam is sequenced in an orderly fashion to avoid confusion between the signals.

6 Claims, 4 Drawing Figures

PATENTED MAY 6 1975
3,882,497
SHEET 1
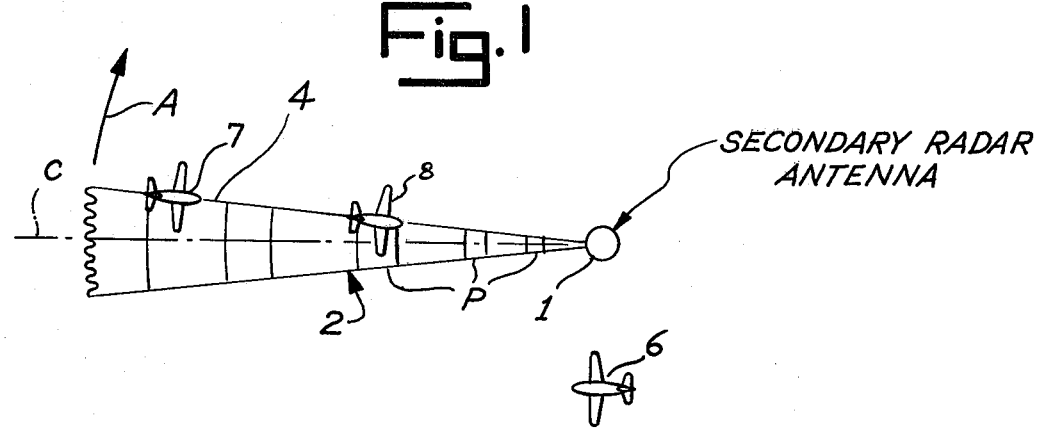
Fig. 1
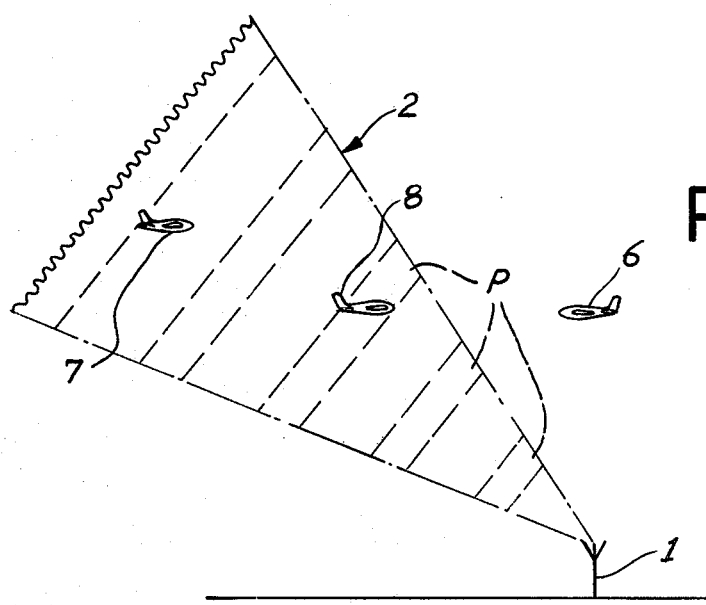
Fig. 2
| MILES FROM ANTENNA TO AIRCRAFT | APPROXIMATE PROPAGATION TIME FROM ANTENNA TO AIRCRAFT IN MICROSECONDS |
|---|---|
| 200 | 1,000 |
| 180 | 900 |
| 160 | 800 |
| 140 | 700 |
| 120 | 600 |
| 100 | 500 |
| 80 | 400 |
| 60 | 300 |
| 40 | 200 |
| 20 | 100 |
| 0 | 0 |
Fig. 3

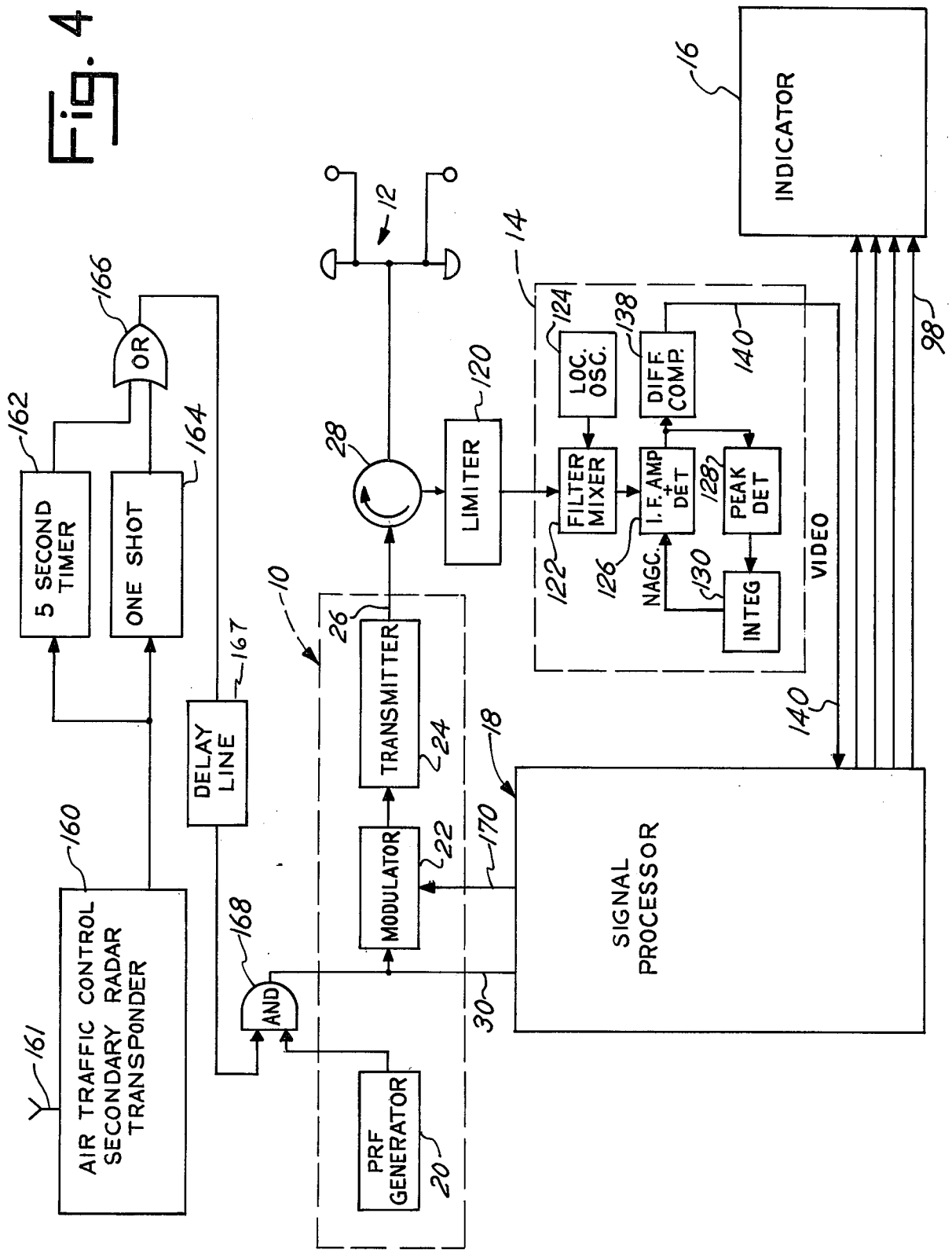

SYNCHRONIZING TECHNIQUES FOR AN AIRCRAFT COLLISION AVOIDANCE SYSTEM

BACKGROUND OF THE INVENTION

This invention relates to aircraft collision avoidance systems, and more particularly relates to techniques for synchronizing and sequencing the flow of information in such systems.

During the last few decades, there have been a number of mid-air collisions of aircraft. In order to minimize the possibility of such collisions, efforts have been made to develop various types of collision avoidance systems. For example, during the mid 1950's, there were efforts to develop a self-contained system which would protect an aircraft without the need for other aircraft to be suitably equipped with complementary systems. However, after such an approach proved difficult to achieve, development efforts shifted to a cooperative-type collision avoidance system in which the aircraft in the system carry complementary or identical equipment.

During the 1960's, cooperative-type collision avoidance systems have been developed in which each equipped aircraft transmits an interrogating signal to which other similarly equipped aircraft respond by transmitting a response signal. From the information contained in the interrogating and response signals, each aircraft in the system can determine whether any of the other aircraft in the system poses a collision threat. The criteria for making this determination generally include (1) relative altitude separation; (2) distance (range) separation; and (3) closing rate.

Experience has shown that the cooperative-type collision avoidance system faces a major obstacle which is generally known as the N-squared ($N^2$) problem, where N refers to the number of collision avoidance system equipped aircraft within communication of one another. If each aircraft in the system replies to the interrogating signal of every other aircraft, the number of responses generated equals $N^2-N$, or essentially the square of the number of aircraft. In high density aircraft terminal areas, such as New York, Chicago and Los Angeles, the number of avoidance system responses is so great that "own" aircraft may have trouble distinguishing whether the response signal of another aircraft is in reply to its own interrogation or the interrogation of another aircraft. This difficulty in discriminating between true replies and replies intended for other interrogating aircraft can result in erroneous evaluation of a collision threat.

A variety of techniques have been proposed to avoid the $N^2$ problem. According to one such proposal, each aircraft in the system is equipped with an atomic clock capable of keeping time to an accuracy of about 0.1 microsecond. Each aircraft is assigned a specific time slot in which it transmits interrogating signals, while other aircraft are assigned different time slots. The accuracy and spacing of the time slots is maintained by the atomic clock aboard each aircraft. Although such a system tends to minimize the $N^2$ problem, experience has shown that the cost of the system is extremely high. As a result, it is very costly for widespread use in small, relatively inexpensive aircraft.

According to another technique, a responding aircraft transmits a response signal only to an interrogating aircraft that is approximately at the same altitude as the responding aircraft. Although this system eliminates many of the response signals generated in a conventional cooperative-type collision avoidance system, it still results in a relatively large number of response signals in congested traffic areas. A system of this type is disclosed in U.S. Pat. No. 3,603,993 (Follen et al. - Sept. 7, 1971).

Another collision avoidance technique is described in U.S. Pat. No. 3,550,129 (Steele - Dec. 22, 1970). According to the Steele patent, a synchronizing signal is transmitted from a satellite which enables the transmission of an interrogating signal from each aircraft in the collision avoidance system. According to this technique, the time of arrival of the synchronizing signal is determined solely by the distance from each aircraft to the satellite. As a result, when the distances between the aircraft are small compared to the distance from the satellite to the aircraft or when several aircraft are substantially equidistant from the satellite, all will therefore interrogate at essentially the same time, providing scant alleviation of the $N^2$ problem.

Still another collision avoidance technique is described in U.S. Pat. No. 3,713,161 (Rice - Jan. 23, 1973). Each aircraft in this system is equipped with a transponder capable of transmitting a reply signal in response to the receipt of a ground-controlled radar beam. Each aircraft listens for the reply signal transmitted by the other aircraft in the system. If one aircraft receives such a reply signal, it is alerted that there are other aircraft in the general vicinity. But the reply signal does not provide information that can be used to determine if a collision threat does exist, or what evasive maneuvers need to be taken. Additionally, there are other limitations in high-density areas.

In the system described herein, the secondary radar beam serves only to synchronize the time of interrogation by a separate cooperative type collision avoidance system which can evaluate the threat and determine optimum evasive maneuvers.

SUMMARY OF THE INVENTION

In order to overcome the high cost of the atomic clock collision avoidance technique and to minimize the $N^2$ problem, we have invented a collision avoidance system in which interrogating signals are transmitted only when an aircraft is illuminated by a ground-controlled radar beam which is cyclically moved so that it sequentially intercepts all aircraft within its range. By employing this system, the transmission of interrogating signals from the aircraft is synchronized or sequenced by the radar beam to minimize the $N^2$ problem. In order to obtain up-to-date collision avoidance information, each aircraft is equipped to respond to each interrogating signal.

According to a principal feature of the invention, each aircraft in the system would be equipped with identical apparatus which would include a means for generating a start signal in response to the receipt of the radar beam. After the start signal is generated, an interrogating signal is transmitted to other aircraft in the area. The other aircraft then transmit response signals which are received by the interrogating aircraft. Information derived from the interrogating and response signals is processed in order to determine the relative positions of the aircraft and whether any of the aircraft is a collision threat to the interrogating aircraft. The interrogating aircraft also has a means of transmitting a response signal in reply to the receipt of each interrogating signal transmitted by other aircraft in the system as the radar beam sequentially strikes them.

By using this apparatus, the transmission of interrogating signals is sequenced and synchronized in an orderly fashion by the sweep of the ground-controlled radar beam so that the $N^2$ problem is greatly reduced. Moreover, since most of the continental United States is covered by air traffic control radar beams, the system can be implemented at modest cost by using existing airborne radar transponders already installed in many of the nation's aircraft. By following the teachings of the invention, air collisions can be avoided with a degree of reliability and economy previously unavailable.

DESCRIPTION OF THE DRAWINGS

These and other advantages and features of the present invention will hereafter appear in connection with the accompanying drawings which disclose a preferred embodiment of the present invention, and in which:

FIG. 1 is a top plan schematic drawing showing the sweep of a conventional air traffic control secondary radar installation in relationship to aircraft within range of the radar beam produced by the installation;

FIG. 2 is a side elevational view of the structure and beam shown in FIG. 1;

FIG. 3 is a table showing the time required for a radar beam to propagate through the atmosphere; and FIG. 4 is an electrical schematic block diagram of a preferred form of apparatus to be carried by each aircraft in a collision avoidance system designed in accordance with the invention.

DESCRIPTION OF THE PREFERRED EMBODIMENT

FIG. 1 illustrates a conventional air traffic control secondary radar antenna or air traffic control radar beacon system (ATCRBS) 1 that is rotated at the rate of 15 revolutions per minute, or one revolution per 4 seconds. Antenna 1 generates a corresponding radar beam 2 having a leading edge 4 and a center line C that is rotated in the direction of arrow A at the same rate as the rotation of the antenna. The radar beam is generated in the form of pulses P which propagate through the atmosphere at the approximate rate indicated by FIG. 3.

Over the continental United States, there is essentially continuous secondary radar coverage above 18,000 feet altitude, and in most of the continental United States, this coverage is extensive at far lower altitudes. In all regions where the $N^2$ problem is of consequence, there is continuous secondary radar coverage.

FIGS. 1 and 2 also illustrate exemplary aircraft 6 and 7, each of which carries the equipment schematically shown in FIG. 4.

Referring to FIG. 4, each aircraft carries a transmitter unit 10, an antenna 12, a receiver 14, an indicator 16, and a digital signal processor 18. A PRF generator 20 initiates an interrogating signal by energizing a modulator 22 which fires a transmitter 24. Modulator 22 has an inherent delay which typically is about 400 nanoseconds. Generator 20, for example, has a PRF of about 100 cycles per second, is free running, and is dithered (noise modulated) over a plus or minus 10 percent range to prevent possible coincidence with PRF generators on other like-equipped aircraft. Transmitter 24 emits narrow RF pulses which, for example, are about 50 nanoseconds wide and have a peak power of about 100 watts. Transmitter 24 may be a pulsed, tuned cavity power oscillator operated at about 5.08 giga Hertz. Pulsing the power oscillator causes RF output pulses to be generated. The RF pulses generated by transmitter 24, present on a conductor 26, pass through a ferrite circulator 28 to antenna 12. Antenna 12 comprises two quarter-wave stubs.

Receiver 14 is a broadband superhet which minimizes the need for frequency stability, therefore eliminating the need for any active form of automatic frequency control. Signals received by antenna 12 pass through ferrite circulator 28 and a limiter 120 and are applied to a composite RF filter-balanced mixer 122. The output of a local oscillator 124 is also applied to filter/mixer 122. The intermediate-frequency (IF) signal out of filter/mixer 122 is applied to an IF amplifier which in turn drives a full-wave detector. Both the IF amplifier and the full-wave detector are shown in a single block 126. A peak detector 128 and a series integrator 130 provide a noise automatic gain control (NAGC) feedback signal around the IF amplifier and full-wave detector 126. The NAGC essentially maintains an optimum IF output noise level with respect to a fixed threshold regardless of a drift in gain of the IF amplifier 126 or changes in the input noise level. Video pulses at the output of full-wave detector 126 which exceed a fixed threshold pass through a differential comparator 138. In this particular system, where sensitivity is not a problem, a sizeable signal/noise ratio (of about 14 db.) is required for the input signal to reach a fixed threshold. This results in a low probability of false alarms.

The video signal output of differential comparator 138 present on a line 140, passes into signal processor 18. Signal processor 18 includes circuitry for transmitting an interrogating signal which indicates the altitude of the interrogating aircraft. In addition, signal processor 18 compares the altitude information received in an interrogating signal with the altitude of the receiving aircraft so that a response signal is generated only if the receiving aircraft is at or near the altitude of the interrogating aircraft.

Indicator 16 provides a visual indication when a responding aircraft is at or near the altitude of an interrogating aircraft.

Each of the foregoing components is more particularly described by the like-numbered elements in U.S. Pat. No. 3,603,993 (Follen et al. - Sept. 7, 1971) and the descriptive material in that patent is incorporated herein by reference.

The preferred embodiment of the present invention also comprises a conventional airborne air traffic control (ATC) radar transponder 160, including an antenna 161. As those skilled in the art readily recognize, such a transponder is capable of generating various signals when the aircraft is illuminated and interrogated by radar beam 2. When antenna 161 is illuminated by beam 2, transponder 160 receives a coded interrogation signal which requests a reply either with a pilot-selected identity code or an aircraft barometric altitude, or both. The reply can serve as a start signal which triggers a one-shot multivibrator 164. One-shot 164 produces a 40 millisecond pulse which is transmitted to an OR gate 166. OR gate 166 transmits a corresponding pulse through a delay line 167 to a logical AND gate switching circuit 168 that enables the signals from PRF generator 20 to be transmitted to modulator 22.

The use of a conventional ATC radar transponder is an important feature because most planes are already equipped with such a device. In addition, because such transponders are relatively low priced, the owners of light weight, privately-owned airplanes can afford to purchase such equipment.

Those skilled in the art recognize that transponder 160 can also be used with an improved discrete address beacon system (DABS) now under development. When used with DABS, transponder 160 will reply only when it receives an interrogation signal specifically addressed to it and asking for its identity and/or altitude. Such a system would improve the collision avoidance effectiveness of the apparatus described herein.

When an aircraft is outside the range of an air traffic control radar beam, a 5 second timer 162 automatically produces a start signal every 5 seconds so that an interrogating signal is transmitted. Similarly, additional logic circuitry could be added to prevent the premature transmission of interrogating signals in areas covered by more than one radar beam.

The system operates as follows. As the leading edge 4 of beam 2 strikes aircraft 7, transponder 160 produces a start signal that results in a 40 millisecond pulse produced by one-shot 164. During this pulse, PRF generator 20 transmits a signal to modulator 22 so that an interrogating signal is transmitted to aircraft 6 (as well as any other aircraft in the area) by antenna 12. As explained in U.S. Pat. No. 3,603,993, the interrogating signal contains information about the altitude of aircraft 7. After the 40 millisecond pulse from one-shot 164 is terminated, AND gate 168 is switched off in order to disable PRF generator 20 from producing additional interrogating pulses.

The interrogating signal is received by aircraft 6 which also contains equipment of the type shown in FIG. 4. The interrogating signal is detected by receiver 14 and the altitude information contained in the signal is compared with the altitude of aircraft 6 by signal processor 18. If the altitudes of aircraft 6 and 7 are similar, a response signal is generated and conducted over a conductor 170 to modulator 22. (Conductor 170 corresponds to the conductor between one-shot multivibrator 56 and modulator 22 shown in U.S. Pat. No. 3,603,993). The response signal is then transmitted through antenna 12 to aircraft 7. At aircraft 7, the response signal is detected and is used to provide a visual indication on indicator 16 that aircraft 6 is flying at or near the same altitude as aircraft 7.

When the leading edge 4 of beam 2 strikes aircraft 6, aircraft 6 then transmits interrogating signals and aircraft 7 transmits response signals in the manner previously described.

Although the above-described system adequately synchronizes the interrogating pulses between aircraft 6 and 7, it raises one difficulty with respect to aircraft flying along a single radius of antenna 1, such as aircraft 7 and 8. Assuming the aircraft were flying approximately 15,000 feet apart, beam 2 reaches aircraft 8 approximately 15 milliseconds before it reaches aircraft 7. Assuming delay line 167 delays the pulse from OR gate 166 by an equal time interval in both aircraft, the interrogating signal from airplane 8 could reach aircraft 7 at the same time aircraft 7 is transmitting its own interrogating signals. During this period of time, the receiver of aircraft 7 is disabled so it will not respond to its own interrogation with the result that aircraft 7 could not reply to the interrogation from aircraft 8 and the latter would be unaware of aircraft 7's presence.

In order to alleviate this problem, it would be advantageous if the delay lines corresponding to delay line 167 in each aircraft were adjusted to delay the pulse from OR gate 166 by a different time interval. By providing a different time delay interval in each aircraft, the start of the interrogation cycle for each aircraft after secondary radar beam illumination would occur at a slightly different time, avoiding the problem cited above for aircraft on a common azimuth radial of the radar. This can be achieved in practice by manufacturing the delay lines in series of 100 so that each successive delay line in a series delays an input signal an additional 100 microseconds. For example, the first delay line in the series would have a delay of zero microseconds, the second delay line in the series would have a delay of 100 microseconds, the third delay line in the series would have a delay of 200 microseconds, etc., until the 100th delay line in the series would have a delay of 10,000 microseconds. In other words, each delay line in the series would establish a different interrogating signal transmission "time slot", each time slot being separated by 100 microseconds. Since it is extremely unlikely that aircraft 7 and 8 would have the same time delay in their delay lines as well as having the same azimuth position relative to antenna 1, the problem of simultaneous interrogating signal transmission is avoided in practice.

In summary, the applicants have discovered that the $N^2$ problem can be substantially reduced by using existing air traffic control secondary radar systems and secondary transponder equipment which is already installed on most aircraft. By using this unique system of sequencing collision avoidance signals, collisions can be avoided with a degree of accuracy and reliability heretofore unattainable without substantially increasing the cost of the system.

Those skilled in the art will recognize that the techniques disclosed herein merely illustrates one preferred practice of the incention and that these techniques may be altered and modified without departing from the spirit and scope of the invention as defined in the appended claims.

What is claimed is:

1. Apparatus for avoiding collision between a first aircraft and a second aircraft located within the range of a ground controlled radar beam that is cyclically moved through a predetermined arc so that the beam periodically strikes the first and second aircraft comprising:

a secondary radar transponder located on the first aircraft for generating a first start signal in response to the receipt of the radar beam;

means located on the first aircraft for transmitting a first interrogating signal to the second aircraft in response to the first start signal, for receiving a first response signal from the second aircraft and for transmitting a second response signal in response to a second interrogating signal received from the second aircraft, said means comprising a pulse generator for generating pulses, a modulator for modulating the pulses, a transmitter for transmitting the modulated pulses at radio frequency, and electronic logic means for interconnecting the pulse generator to the modulator in response to the start signal, said electronic logic means including means for enabling the transmitting of the first interrogating signal for a first predetermined time period and for thereafter preventing the transmitting of the first interrogating signal for a second predetermined time period;

means located on the second aircraft for transmitting the first response signal in response to the first interrogating signal received from the first aircraft, for generating a second start signal in response to the receipt of the radar beam, for transmitting the second interrogating signal to the first aircraft in response to the second start signal and for receiving the second response signal;

means located on the first aircraft for processing information derived from the first interrogating signal and the first response signal to determine the relative location of the first and second aircraft; and means located on the second aircraft for processing information derived from the second interrogating signal and the second response signal to determine the relative location of the first and second aircraft, whereby the transmission of interrogating signals by the first and second aircraft is sequenced and synchronized by the movement of the radar beam.

2. In a system for avoiding collision between a group of aircraft within range of a ground-controlled beam of electromagnetic radiation that is cyclically moved through a predetermined arc so that the beam periodically strikes the aircraft, improved apparatus carried on one of the aircraft in the group and adapted to cooperate with like apparatus carried on other aircraft in the group comprising in combination:

a secondary radar transponder for generating a start signal in response to the receipt of the beam;

means for transmitting an interrogating signal to the other aircraft in response to the start signal, for receiving response signals transmitted by the other aircraft in response to the interrogating signal and for transmitting a response signal in response to the receipt of each interrogating signal transmitted by the other aircraft, said means comprising a pulse generator for generating pulses, a modulator for modulating the pulses, a transmitter for transmitting the modulated pulses at radio frequency, and electronic logic means for interconnecting the pulse generator to the modulator in response to the start signal, said electronic logic means including means for enabling the transmitting of the interrogating signal from the one aircraft for a first predetermined time period and for thereafter preventing the transmitting of the interrogating signal from the one aircraft for a second predetermined time period; and means for processing information derived from the interrogating signal and the response signals to determine the relative positions of the one aircraft and the other aircraft.

3. A method for avoiding collision between a first aircraft and a second aircraft located within the range of a ground controlled radar beam that is cyclically moved through a predetermined arc so that the beam periodically strikes the first and second aircraft, said method comprising the steps of:

generating a first start signal aboard the first aircraft in response to the receipt of the radar beam;

transmitting a first interrogating signal from the first aircraft to the second aircraft in response to the first start signal;

preventing the transmitting of an interrogating signal aboard the first aircraft for a predetermined time period following the termination of the first interrogating signal;

receiving the first interrogating signal aboard the second aircraft;

transmitting a first response signal from the second aircraft to the first aircraft in response to the first interrogating signal;

receiving the first response signal aboard the first aircraft;

processing information derived from the first interrogating signal and the first response signal aboard the first aircraft to determine the relative position of the first and second aircraft;

generating a second start signal aboard the second aircraft in response to the receipt of the radar beam;

transmitting a second interrogating signal from the second aircraft to the first aircraft in response to the second start signal;

preventing the transmitting of an interrogating signal aboard the second aircraft for a predetermined time period following the termination of the second interrogating signal;

receiving the second interrogating signal aboard the first aircraft;

transmitting a second response signal from the first aircraft to the second aircraft in response to the second interrogating signal;

receiving the second response signal aboard the second aircraft; and processing information derived from the second interrogating signal and the second response signal aboard the second aircraft to determine the relative position of the first and second aircraft, whereby the transmission of the interrogating signals by the first and second aircraft is sequenced and synchronized by the movement of the radar beam.

4. Apparatus for avoiding collision between a first aircraft and a second aircraft located within the range of a ground controlled radar beam that is cyclically moved through a predetermined arc so that the beam periodically strikes the first and second aircraft comprising:

means located on the first aircraft for generating a first start signal in response to the receipt of the radar beam;

means located on the first aircraft for transmitting a first interrogating signal to the second aircraft in response to the first start signal, for receiving a first response signal from the second aircraft and for transmitting a second response signal in response to a second interrogating signal received from the second aircraft;

first delay means for delaying the transmitting of the first interrogating signal from the first aircraft to the second aircraft for a first predetermined time period;

means located on the second aircraft for transmitting the first response signal in response to the first interrogating signal received from the first aircraft, for generating a second start signal in response to the receipt of the radar beam, for transmitting the second interrogating signal to the first aircraft in response to the second start signal and for receiving the second response signal;

second delay means for delaying the transmitting of the second interrogating signal from the second aircraft to the first aircraft for a second predetermined time period different from the first predetermined time period;

means located on the first aircraft for processing information derived from the first interrogating signal and the first response signal to determine the relative location of the first and second aircraft; and means located on the second aircraft for processing information derived from the second interrogating signal and the second response signal to determine the relative location of the first and second aircraft, whereby the transmission of interrogating signals by the first and second aircraft is sequenced and synchronized by the movement of the radar beam.

5. In a system for avoiding collision between a group of aircraft within range of a ground-controlled beam of electromagnetic radiation that is cyclically moved through a predetermined arc so that the beam periodically strikes the aircraft, improved apparatus carried on one of the aircraft in the group and adapted to cooperate with like apparatus carried on other aircraft in the group comprising in combination:

means for generating a start signal in response to the receipt of the beam;

means for transmitting an interrogating signal to the other aircraft in response to the start signal, for receiving response signals transmitted by the other aircraft in response to the interrogating signal and for transmitting a response signal in response to the receipt of each interrogating signal transmitted by the other aircraft;

delay means for delaying the transmitting of the interrogating signal to the other aircraft for an adjustable time period; and means for processing information derived from the interrogating signal and the response signals received from the other aircraft to determine the relative positions of the one aircraft and the other aircraft.

6. A method for avoiding collision between a first aircraft and a second aircraft located within the range of a ground controlled radar beam that is cyclically moved through a predetermined arc so that the beam periodically strikes the first and second aircraft, said method comprising the steps of:

generating a first start signal aboard the first aircraft in response to the receipt of the radar beam;

transmitting a first interrogating signal from the first aircraft to the second aircraft in response to the first start signal after waiting for a first predetermined time period;

receiving the first interrogating signal aboard the second aircraft;

transmitting a first response signal from the second aircraft to the first aircraft in response to the first interrogating signal;

receiving the first response signal aboard the first aircraft;

processing information derived from the first interrogating signal and the first response signal aboard the first aircraft to determine the relative position of the first and second aircraft;

generating a second start signal aboard the second aircraft in response to the receipt of the radar beam;

transmitting a second interrogating signal from the second aircraft to the first aircraft in response to the second start signal after waiting for a second predetermined time period different from the first predetermined time period;

receiving the second interrogating signal aboard the first aircraft;

transmitting a second response signal from the first aircraft to the second aircraft in response to the second interrogating signal;

receiving the second response signal aboard the second aircraft; and processing information derived from the second interrogating signal and the second response signal aboard the second aircraft to determine the relative position of the first and second aircraft, whereby the transmission of the interrogating signals by the first and second aircraft is sequenced and synchronized by the movement of the radar beam.

* * * * *